United States Patent [19]

Thomas et al.

[11] Patent Number: 4,716,044
[45] Date of Patent: Dec. 29, 1987

[54] PROCESS FOR OBTAINING JUICES FROM FRUITS CONTAINING SAME

[75] Inventors: Ronald L. Thomas, Clemson; Terry C. Titus, Seneca; Craig A. Brandon, Clemson, all of S.C.

[73] Assignee: Clemson University, Clemson, S.C.

[21] Appl. No.: 825,083

[22] Filed: Jan. 31, 1986

[51] Int. Cl.$^4$ .......................... A23L 2/06; B01D 13/00
[52] U.S. Cl. .......................................... 426/51; 426/52; 426/489; 426/495
[58] Field of Search ................... 426/51, 52, 599, 490, 426/492, 481, 495, 489, 431; 210/651

[56] References Cited

U.S. PATENT DOCUMENTS

| | | | |
|---|---|---|---|
| 3,347,678 | 10/1967 | Stampe et al. | 426/51 |
| 4,275,648 | 6/1981 | Mouri et al. | 426/51 |
| 4,299,849 | 11/1981 | Mouri et al. | 426/51 |
| 4,551,341 | 11/1985 | Blanie et al. | 426/489 |

*Primary Examiner*—Raymond N. Jones
*Assistant Examiner*—Marianne M. Cintins
*Attorney, Agent, or Firm*—Dority & Manning

[57] ABSTRACT

An improved process for obtaining juice from fruit. The fruit is processed to provide a pumpable fluid puree of fruit and juice which is pumped at pressures in a range of from about 100 to about 1000 pounds per square inch in a single pass through a rigid porous tubular housing having a diameter of from about ⅜ inch to about six inches and having a food grade ultrafiltration membrane deposited on inside surfaces of same. Initial permeability (P) of the membrane to water is from about 1 to about 15 according to the formula $$P = \frac{\text{permeate flux}}{\text{pressure}}$$

where permeate flux is gallons of water passing through a square foot of membrane area per day and pressure is measured in pounds per square inch. Exit pressure from the housing is maintained in a range of from about 50 to about 100 pounds per square inch. Clear, commercially sterile juice with the taste and aroma of fresh fruit can be obtained at juice yields of at least about 78%.

18 Claims, 1 Drawing Figure

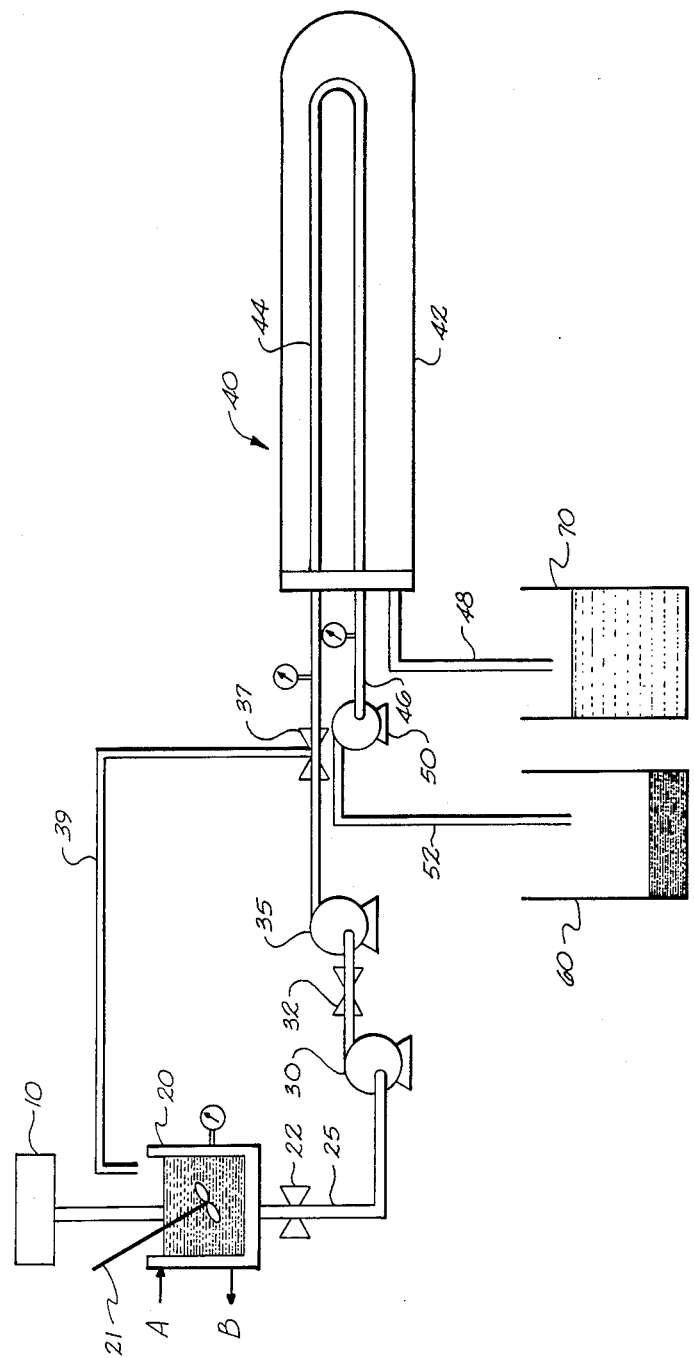

PROCESS FOR OBTAINING JUICES FROM FRUITS CONTAINING SAME

BACKGROUND OF THE INVENTION

The present invention relates to an improved process for obtaining juices from fresh fruits which process yields an improved, sterilized product having retained taste and aroma of the fresh fruit from which the juice was extracted.

Historically, the production of fruit juices has been achieved by processes that not only are expensive in capital equipment requirements, time and labor, but which also render the residual fruit pulp or concentrate unfit for human consumption. Further, such prior art processes generally provide a final juice product that, after pasteurization and/or sterilization has a taste distinct from the fresh fruit due to the processing conditions to which the juice product has been subjected.

By way of example of prior art processes, current commercial production of apple juice involves the steps of crushing the fruit, mixing the crushed fruit with rice hulls for better handling, and pressing of same to achieve a cloudy juice extract and a residual fruit-rice hull pulp. Due to the presence of the rice hulls, the residue or filtrant is not suitable for human ingestion, and is either discarded or utilized as animal feed. The cloudy juice extract is then prefiltered to provide a primary juice, leaving behind further quantities of fruit pulp. Prefiltered juices may then follow one of two processing routes. Depending upon the particular juice being processed, it may be desirable to treat same with one or more enzymes which break down particular pulp residual segments of the juice and lower viscosity of the juice. The juice, treated or untreated with enzymes product, may then be subjected to ultrafiltration followed by aseptic packaging. Alternatively, the pressed or prefiltered juice may be mixed with a filtering aid such as diatamaceous earth followed by filtration, through plate and frame filters, sparkling filters or the like. The final filtrate is then pasteurized and bottled hot, while the unusable filter sludge is discarded.

Following the procedures of the above processes, as noted above, overall cost is intensive, both from a capital investment standpoint and from an operational standpoint. For example, the various filters require frequent maintenance and/or cleaning, particularly the plate/frame filters. Also microorganisms collect in the filter media and can contaminate juices from subsequent filter passes.

The prior art, even in use of ultrafiltration devices, has found it necessary to first crush the fruit and mix the fruit with rice hulls, and also to prefilter the crushed fruit prior to ultrafiltration. In other words, while ultrafiltration has heretofore been generally utilized for the extraction of various plant juices, the plants have been first pressed and prefiltered, just like other prior art filtration processes. Such ultrafiltration systems, however, still have generally encountered severe membrane fouling due to suspended solids and/or concentration effects as a result of recirculation.

One such prior art process involving the use of ultrafiltration is disclosed in U.S. Pat. No. 4,551,341 to Blanie et al. Blanie et al. is directed to a process for producing clear plant juices in which, following a conventional pressing step, the pulp is separated from a primary juice. The primary juice is then adjusted for pH within a range between 3.5 and 4.0 and for temperature within a range of 50 to 65 degrees centigrade and subjected to a first stage of ultrafiltration to separate primary juice from pectate raw concentrate. The raw concentrate is then passed to at least a second stage of ultrafiltration after being diluted, if needed, with water or clear juice. Blanie et al. discloses ultrafiltration to exclude products having a molecular weight above 15,000 to 25,000 and preferably operates at an introduction pressure within a range of 3 to 5 kilograms per square centimeter and an exit pressure in a range of 1 to 2 kilograms per square centimeter. Tubular ultrafiltration membranes are stated to be preferred by Blanie et al. as permitting a greater linear speed of circulation of fluids and a reduction in the risk of clogging of the membrane. While maximum temperatures of 65 degrees Centigrade are stated to be usable with a number of commercially available membranes, temperature constraints are stated to tend to disappear with the utilization of metallic materials or other porous materials having a predetermined porosity to the ultrafiltration.

In addition to Blanie et al., additional prior art known to exist includes U.S. Pat. Nos. 2,079,542 to Bauer et al.; 2,724,652 to Brent et al.; 3,042,528 to Rowse; 3,053,668 to Lund; 3,301,684 to Bosg; and 3,346,392 to Lowe et al., each of which is directed to production of fruit and vegetable juices following conventional prior process set forth above.

The present invention is directed to an improved process for the production of fruit juices, involving ultrafiltration, but where it is necessary to only process the fruit to a pumpable fluid puree state, add liquefaction enzymes, if necessary, and thereafter pump the resulting puree of fruit and juice directly through an ultrafiltration system that is defined by a rigid porous housing having a food grade ultrafiltration membrane secured along inside walls of the housing. There is no known prior art that is believed to anticipate or suggest the process of the present invention.

SUMMARY OF THE INVENTION

It is an object of the present invention to provide an improved process for obtaining juices from fruit.

Another object of the present invention is to provide an improved process for the production of fruit juices which is both cost effective and yields an improved juice product.

Still further another object of the present invention is to provide an improved process for the production of juices from fresh fruits by the simultaneous extraction and clarification of the juice, yielding a commercially sterile juice product that approaches the taste and aroma of the fresh fruit.

Still further another object of the present invention is to provide an improved process for the production of fruit juices by a single pass ultrafiltration of a puree containing fruit and juice.

Generally speaking, the process of the present invention for the production of juices from fruit containing same comprises the steps of processing the fruit from which the juice is to be obtained to produce a pumpable fluid puree containing fruit and juice; providing an elongated rigid porous housing having a food grade ultrafiltration membrane secured along inside surfaces of said housing, said membrane having an initial permeability (P) to water from about 1 to about 15 as determined by the formula $$P = \frac{\text{permeate flux}}{\text{pressure}}$$

where permeate flux is measured in gallons per square foot of membrane per day and pressure is measured in pounds per square inch; pumping said puree through said housing at an inlet pressure of from about 100 to about 1000 pounds per square inch where said puree makes tangential contact with said membrane and juices from said puree are simultaneously extracted from said puree and clarified by passage through said membrane; and collecting said extracted juices outside said porous housing.

More specifically, in practicing the process of the present invention, once the fruit is processed to produce a pumpable fluid puree of same, depending upon the contents of the foodstuff it may be desirable to subject same to enzymatic activity to decrease viscosity of the mass. In those fruits in which enzymatic activity is desirable, conventional liquefaction enzyme compositions may be added thereto in predetermined amounts with the enzymatic activity continued at a predetermined temperature for a predetermined period of time. Likewise, smaller quantities of technical grade enzymes may also generally be employed.

Suitable enzymes for use according to the present invention primarly include without limitation, pectinase, cellulase and/or amylase which may be added in a mixture of up to about 0.044% based on the total weight of the puree. Enzymatic activity is preferably permitted to continue for a period of from about 45 to about 90 minutes at the natural pH of the foodstuff and at a temperature ranging from about 25 to 50 degrees Centigrade.

Particular advantages achievable by the process of the present invention include the ability to alleviate any prefiltration of the processed fruits to first obtain a prefiltered juice that is then submitted to further processing including as stated above, ultrafiltration. Instead, once the pumpable fluid puree of juice is obtained and, if necessary, treated with the enzymes, the puree is pumped directly to the ultrafiltration system. During a single pass through the ultrafiltration system, juices from the puree are simultaneously extracted from the puree at a yield of from about 78 to about 90 percent of the mass and clarified, yielding a highly clarified, sterilized juice product which retains the natural taste and aroma of the fresh fruit. Additionally, the pulp retentate exits the ultrafiltration system in a form suitable for human consumption. Hence, not only is the conventional approach to the production of fruit juices shortened and simplified, the process is significantly less cost intensive, and most importantly, a greatly improved product is obtained.

The ultrafiltration system that has been found to provide the surprising results noted above, is generally described in U.S. Pat. No. 4,200,533 to Gaddis et al. Certain particular parameters of the system per se for purposes of the present invention, are not specifically set forth therein. Particularly, according to the present invention, the tubular housing is preferably a porous metallic housing, such as sintered stainless steel, so as to alleviate any concern for certain process conditions, such as temperature and pressure which might otherwise normally adversely affect the tubular housing or not be suitable at all therefor. The tubular housing is also preferably of a diameter between about ⅜ inch to about six inches and most preferably about 1¼ inches with a food grade ultrafiltration membrane deposited along inside surfaces of the housing. While the membrane may be polymeric or metallic, such is preferably formed from a metallic oxide, and should have an initial permeability (P) to water between about 1 and about 15 as defined by the formula $$P = \frac{\text{permeate flux}}{\text{pressure}}$$

where permeate flux is defined in gallons per square foot of membrane per day and pressure is measured in pounds per square inch. A preferred initial membrane permeability to water is about 5. Moreover, in order to achieve adequate yield of juice from the puree in a single pass, the tubular housing should have adequate length, dependent upon the diameter of same to provide a predetermined membrane surface area. Moreover, pressure drop across the length of the housing should be adequate to ensure continuous flow through the system. Pressures at the entrance to the system are maintained in a range of from about 100 to about 1000 pounds per square inch while pressure at the exit from the system should be maintained in a level of from about 50 to about 100 pounds per square inch. If necessary, valving may be provided at the exit end of the ultrafiltration system for pressure control and/or control of flow rate of puree through the system.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein examples of the invention are shown and wherein:

FIG. 1 is a schematic illustration of a preferred arrangement for carrying out the process according to the present invention.

DESCRIPTION OF A PREFERRED EMBODIMENT

Making reference to the drawing, preferred embodiments of the present invention will now be described in detail. Fruit being processed is subjected to equipment indicated as 10 for conversion of same to a pumpable fluid puree state, containing both fruit and juice but which, if necessary, has been separated from pits, seeds, peel or the like. In general, a fluid pumpable puree according to the present invention will pass through screen openings ranging from about 0.03 inch to about 0.25 inch. In essence therefore, the fruit, may be subjected to some type of comminution such as conventional grinding, a hammer mill, a Fitz mill or the like for conversion of same. The Fitz mill comminutes the entire fruit into puree, including stems, seeds, and the like. Conversely, with grinding or a hammer mill, it may be necessary to subject the mash to finishing where seeds and the like are screened from the puree.

The puree may then be stored in a suitable vat 20 equipped with an agitator 21, and in which temperature of the puree may be controlled. As illustrated, vat 20 is jacketed to receive steam within the jacket for heating, entering at arrow A, and with condensate exiting from the jacket through the indicated arrow B.

Depending upon the particular fruit being processed, it may be necessary or desirable to subject same to enzymatic action for reduction of viscosity of the puree. Particularly, reduction of viscosity of the puree may be achieved by treating same with enzymes prior to ultrafiltration. Such ensures smoother operation in the ultrafiltration system and yields higher percentages of juice since viscosity of the retentate or concentrate that exits the ultrafiltration system is lowered.

Typical commercial liquefaction enzyme compositions are quite suitable for treatment of purees according to the present invention. Such compositions may for example, include enzymes such as pectinase, cellulase, and amylase or mixtures of same, and may be added to the foodstuff or puree in an amount up to about 0.044 percent based on the total weight of the mass. One suitable commercial liquefaction enzyme composition is PECTINEX ULTRA SP-L which contains a mixture of the three enzymes noted above, and is available from Novo Laboratories, Inc., Wilton, Conn. Technical grade enzymes such as ENZECO pectinase and ENZECO cellulase produced by Enzyme Development Corporation, New York, N.Y. are also suitable, and due to the efficiency of same, may be used in smaller quantities than the commercial enzymes. The enzyme action on the fruit is preferably carried out at the natural pH of the fruit while the fruit mass is maintained at a temperature in a range of from about 25° C. to about 50° C., preferably about 35° C. for a time period of from about 45 to about 90 minutes, preferably about 60 minutes. Referring to the FIGURE, enzyme addition may take place at the processing apparatus 10 while the fruit is being comminuted or otherwise rendered into puree form, or in puree holding vat 20. While in the vat 20, the puree is stirred by agitator 21 just adequately to ensure proper mixing of the enzyme into the mass, if added there.

After the foodstuff is rendered into proper puree form, with or without enzymatic action, the puree is pumped directly to the ultrafiltration system generally indicated as 40. Conversely, prior art processes as exemplified by the Blanie et al. patent noted above, required pressing of the foodstuff to obtain a juice extract. As further illustrated in the FIGURE, the puree passes via conduit 25 and pumps 30 and 35 directly into the filtration system 40. A first manual control valve 22 is provided along conduit 25 between vat and the first pump 30. In one preferred arrangement, pump 30 is a centrifugal suction booster pump to remove puree from vat 20 while pump 35 is a diaphragm pressure pump to pressurize puree fed to ultrafiltration system 40. Any suitable pump arrangement may, however, be employed so long as predetermined pressures and puree flow are achievable thereby. Also as illustrated in the FIGURE, a manual control valve 37 may be provided along conduit 25 to permit unfiltered puree to be diverted via a bypass line 39 back into vat 20 if necessary.

Ultrafiltration system 40 preferably includes a shell 42 that surrounds a rigid, porous tubular housing 44 located therewithin. Porous tubular housing 44 should be such that the ultrafiltration processing may take place without adverse affects thereto. Notably, housing 44 should be resistant to operating temperatures and pressures accompanying the ultrafiltration process according to the present invention, and preferably is a sintered metallic housing, such as sintered stainless steel. Not only therefore would the stainless steel have adequate strength and rigidity to accommodate the high pressures encountered during the present ultrafiltration process, but characteristically the metal is resistant to corrosion, and is capable of withstanding periodic cleaning and resterilization under harsh treatment conditions.

Tubular housing 44 while schematically indicated as a continuous length housing in the FIGURE, may if desired, be represented by a plurality of separate modular housings joined together to define a continuous passageway between an entrance and exit end. In this regard, various arrangements of tubular housing may be dictated by economics and space requirements for the process. For example, as one would readily expect, the actual configuration of tubular housing 44 could be serpentine within separate shells 42 of modular construction, with connection between the modules to facilitate a single pass operation.

Porous housing 44 is provided along inside surfaces of same with a food grade ultrafiltration membrane that is capable of simultaneous extraction of juices from the fruit clarification and sterilization. Preferably, as noted above, a metallic food grade metallic oxide membrane is deposited along the inner matrix or surfaces of housing 44, spanning the pores in same. The metallic membrane should be capable of removal of bacteria, yeast, and other microorganisims. In fact, ultrafiltration membranes according to the present invention are capable of removal of *Pseudomonas dimunata*, the smallest recognized bacterium.

The ultrafiltration membrane deposited within the matrix of housing 44, while not, per se, a part of the present invention, should be formulated to meet an initial permeability (P) to water as defined by the formula $$P = \frac{\text{permeate flux}}{\text{pressure}}$$

where permeate flux is gallons per square foot of membrane per day, and pressure is measured in pounds per square inch. According to the present invention, the ultrafiltration membrane should have an initial permeability to water in a range of from about 1 to about 15, and preferably from about 3 to about 6, and most preferably about 5. With an ultrafiltration membrane as defined above deposited within the matrix of the rigid, porous tubular housing, fruit puree pumped therethrough under appropriate pressure conditions makes tangential contact with the membrane. During a single pass, juice is simultaneously extracted from the puree, and clarified and sterilized during passage through the membrane. Particularly, the juices are forced through the membrane and porous housing as a result of transmembrane pressure, and is collected from the exterior of the housing, preferably as illustrated in the FIGURE in an outer shell 42 that surrounds housing 44 and may pass through a suitable conduit 48 into a tank 70.

Water insoluble sugars, organic acids, flavor compounds and the like will freely pass through the ultrafiltration membrane of the present invention, while insoluble solids, proteins of molecular weight greater than about 14,000, and all microorganisms are retained within the housing to be removed therefrom with the fruit retentate or concentrate at the exit end of same. A gear pump 50 may be located at the exit end of housing 44 to control flow of the retentate through conduit 52 to a holding tank 60. The filtered juices are thus a natural extract of the liquid and soluble components that constitute the flavor and aroma of the foodstuff from which the juice was extracted. While there is a reduction of sugars of about eight to 10 percent in the juice filtrate, the ratio of glucose, fructose and sucrose is not generally altered. Moreover, the retentate is usable for foodstuffs for human consumption.

With an initial permeability of the membrane as recited above, during approximately the first 30 minutes of ultrafiltration operation, fouling of the membrane by various components of the puree will reduce the membrane permeability (P) to a general equilibrium range of from about 0.05 to about 0.15. Permeate flux at this reduced permeability ranges from about 10 to about 50 gallons per square foot of membrane surface per day, dependent upon the fruit being processed and the operating temperature.

Temperature of the ultrafiltration operation should preferably be maintained between from about 10° C. to about 100° C. and preferably at about 50° C. where maximal flux may be achieved without loss or degradation of the natural flavor and odors of the foodstuff. Moreover, as opposed to prior art systems, the process of the present invention may be carried at any pH, and in fact preferably no pH adjustment is made whereby the operation occurs at the natural pH of the fruit which falls generally in a range of about 3 to about 7.

One aspect of the present invention that is highly desirable from both an economic and quality standpoint is the feature that the ultrafiltration may take place during a single pass of puree through the housing. Obviously, in order to permit a single pass operation, the tubular housing must be of adequate length to provide sufficient membrane surface area to achieve an acceptable yield of juice from the puree. Such length is, of course, dependent upon the diameter of the housing. It has been found, by way of example, that a housing length for the preferred $1\frac{1}{4}$ inch diameter tube should range from about 120 to about 600 feet which provides from about 40 to about 180 square feet of membrane surface and yields a juice production rate of from about 100 to about 180 gallons of juice per hour, dependent upon conditions of operation and the particular fruit being processed.

In pumping the foodstuff puree through the tubular housing, velocity of same may be controlled to alter transmembrane pressure and thus juice yield by altering the feed volume flow rate with a pressurizing pump and/or by constricting the flow with appropriate valving at the exit end of the housing. The present process is conducted with inlet puree pressures ranging from about 100 to about 1,000 pounds per square inch, and with exit pressures from the tubular housing 44 being maintained in a range of from about 50 to 100 pounds per square inch. Such pressure drop across the length of the tubular housing ensures continuous puree flow through the housing. Obviously, as juice is being extracted from the puree, the fruit retentate or concentrate becomes increasingly viscous along the length of the housing, resulting in proportionately large pressure drops therealong, especially with a smaller diameter tubular housing. Consequently, reducing viscosity of the puree initialy by way of enzyme treatment as noted above, is preferred for certain fruits for smoother operation and higher juice yields. Along the same lines, larger diameter tubular housings are preferred, better facilitating the flow of highly viscous materials. The preferred diameter tubular housing of $1\frac{1}{4}$ inches has been determined to be sufficiently large to accomplish suitable flow control and, in fact, proper control of outlet retentate flow from a $1\frac{1}{4}$ inch tubular housing of sufficient length can result in juice yields in an 85 to 90 percent range.

Due to the nature of the ultrafiltration housing and membrane, the system can be cleaned in place with appropriate detergents and alkaline cleaners typically used for cleaning food processing equipment. Temperatures of up to 120° C. are not destructive, and the system is not pH sensitive from a pH of 1 to 14. The entire system can also be sterilized by steam injection. By also measuring initial membrane permeability as noted herein, one can readily determine that the system is cleared of contamination by a return to the starting membrane permeability to water.

The particular ultrafiltration system suitable according to the present invention, and as noted above, are provided by Carre, Inc. Seneca, S.C., and are described in the Gaddis et al. U.S. Pat. No. 4,200,533, the subject matter of which is incorporate herein by reference. The following examples will facilitate a better understanding of the process of the present invention.

EXAMPLE I

A quantity of whole apples was fed to a Fitz mill comminutor while metering therein 0.04 percent by weight of PECTINEX ULTRA SP-L, a commercial liquefaction enzyme composition containing cellulase, pectinase and amylase, obtained from Novo Laboratories, Inc., Wilton, Conn. After comminution of the apples, the puree was maintained in a holding tank where enzymatic action was permitted to continue at 35° C. for sixty minutes during stirring. Thereafter the enzyme treated puree containing both furit and juice was pumped from the holding tank at a temperature of 50° C. to an ultrafiltration system that included 140 feet of $\frac{5}{8}$ inch diameter sintered stainless steel tubular housing having a food grade metallic oxide membrane deposited along inside surfaces of the tubular housing, with an initial permeability to water of 5. The ultrafiltration system presented 22 square feet of membrane surface. The apple puree was pumped to the ultrafiltration system at an inlet pressure of 900 psi with an exit pressure of 100 psi. A juice flux rate of 25 gallons per hour was obtained, representative of approximately 85% juice extraction based on total weight of the puree. The juice obtained was clear, had the taste and aroma of the fresh apples and was determined to be commercially sterile.

EXAMPLE II

A further quantity of apples from the same shipment as the apples from Example I was processed by conventional juice extraction techniques. Processing included crushing of the apples, mixing the crushed apples with rice hulls and pressing same to yield a cloudy extract; prefiltering the extract; treating the extracted juice with pectinase; mixing the juice with diatomaceous earth filtering aid; filtering the juice through a plate/frame filter and subsequently through a sparkle filter. The juice was then pasteurized and bottled hot.

EXAMPLE III

Juices obtained from Examples I and II were subjected to taste testing by trained taste panelists. The panelists unanimously selected the ultrafiltrated juice of Example I as having a better and more preferred fruit flavor compared to the conventionally extracted juice of Example II.

EXAMPLE IV

In order to test the commercial sterility of juices obtained according to the process of the present invention, the process of Example I was repeated with the exception that the bacteria, *Pseudomonas dimunata* and *Bacillus coagulans*, and the yeast *Saccharomyces cerevisiae* were added to quantities of apple puree in amounts to provide microbial cell population counts of $2.7 \times 10^6$; $3.5 \times 10^6$; and $3.65 \times 10^6$ colony forming units (CFU) per milliliter, respectively. Hence the above bacteria and yeast contaminants were added to puree in known quantities to test the effectiveness of removal of same by the present process. Juices obtained were thereafter asceptically sampled for the two bacteria and the yeast noted above. In all cases, less than 0.01 cell forming units per milliliter was observed. All of the organisms were thus below detection limits by standard sampling procedures, representing at least an 8 log reduction of each organism. Further, no other organisms, in fact, including mold, were detected in the juices, indicating that the ultrafiltered juices are commercially sterile.

EXAMPLE V

Example I was repeated with the exception that the rigid, porous housing of the ultrafiltration system had a diameter of $1\frac{1}{4}''$, and a length of 120 feet. Apple puree was pumped to the ultrafiltration unit at an inlet pressure of 300 psi with an exit pressure of 50 psi being measured. A yield of slightly better than 85% juice was obtained at a flow rate of approximately 120 gallons per hour. When subjected to a taste test as represented in Example III, again all the trained panelists selected the juice of Example V over juice obtained from the same shipment of apples and processed according to conventional technology as noted in Example III.

EXAMPLE VI

Example I was again repeated with the exception that instead of vigorous comminution of whole apples to a pumpable fluid puree, the apples were less severely crushed in conventional grinding equipment accompanied by the enzyme addition. Thereafter, the apple mash was finished with conventional screen finishing equipment for removal of seeds, peels, stems and the like of the apples. Puree very similar to that obtained in Example I resulted. The puree was then pumped directly to the ultrafiltration systems as described in Examples I and V, with similar results being obtained.

EXAMPLE VII

Quantities of fresh peaches were first pitted and then vigorously comminuted in a Fitz mill while 0.04 percent by weight of ULTRA SP-L liquefaction enzyme composition of was metered thereto. The enzymes were allowed to function at the natural pH of the peach puree and a temperature of 35° C. for 60 minutes. Following enzymatic action, the peach puree was pumped at a temperature of 50° C., and inlet pressure of 300 pounds per square inch directly to an ultrafiltration system having a $1\frac{1}{4}$ inch tubular housing with a metallic oxide membrane (initial permeability of 5) was employed. 480 feet of housing afforded 160 square feet of membrane area, larger than required for apples since an equilibrium permeate flux of 10 to 15 gallons per square foot of membrane per day is experienced. Exit pressure from the ultrafiltration housing was maintained at 50 pounds per square inch. A juice flux of approximately 100 gallons per hour was achieved, representative of a juice yield of about 85 percent.

EXAMPLE VIII

A quantity of grapes was crushed in a conventional grinder so as not to break apart the grape seeds while liquefaction enzyme composition as described in Example I was metered into the crush to achieve 0.02 percent by weight enzymes. Thereafter, the enzymes were allowed to act upon the mash at a temperature of 35° C. for 60 minutes without any pH adjustment. The mash was then conventionally finished to remove seeds and large pieces of peel or hull, resulting in a puree having a reduction in viscosity of 40-50% when compared to a puree formed without the enzymes. The grape puree was then pumped through the ultrafiltration system as defined in Example VII at an inlet pressure of 300 pounds per square inch and an exit pressure 75 pounds per square inch. One hundred gallons per hour of grape juice was obtained, representing an 85% juice yield. The extracted juice was comparable in improvement to that experienced with the apples, i.e. a highly clarified, sterile juice was obtained which retained the taste and aroma of the fresh fruit.

EXAMPLE IX

Example VIII was repeated with the exception that muscadine grapes were utilized in two separate batches, one of which followed the procedure of Example VIII, resulting in a similar juice yield and quality. Since an equilibrium flux of 10-15 gallons per square foot of membrane per day was experienced, 160 square feet of membrane area was required to achieve the clarified juice at a flow rate of 100 gallons per hour (85% yield). The second batch of muscadines, however, also included the addition of about 0.19% by weight calcium chloride which enhances flux through the membrane. In fact, with the calcium chloride addition only 120 square feet of membrane surface was required for 120 gallons per hour juice production (85% juice yield). In both of the muscadine examples, a highly clarified, sterile juice was obtained having the taste and aroma of the fresh fruit.

EXAMPLE X

Example I was repeated with the exception that pears were employed in lieu of apples with 160 square feet of available membrane surface due to a lower permeate flux than apple juice (10-15 gallons per square foot per day). The single pass ultrafiltration yielded 100 gallons per hour of juice (85% yield) which was highly clarified, sterile and retained the taste and aroma of the fresh pears.

EXAMPLE XI

A quantity of fresh pineapples were processed by first removing the tops and peeling as normally required for coring and slicing pineapple. The pineapple flesh was then vigorously comminuted in a Fitz mill, and without pH adjustment or enzyme treatment, was pumped directly to the ultrafiltration unit. The ultrafiltration unit included a $1\frac{1}{4}$ inch diameter tubular housing adequate in length to provide 180 square feet of membrane surface and having a food grade metal oxide membrane deposited therewithin. The pineapple puree was pumped to the ultrafiltration system at 50° C. and an inlet pressure of 300 pounds per square inch. Outlet pressure was maintained at about 50 psi. The ultrafiltration membrane had an initial permeability to water of about 5. A juice yield of 120 gallons per hour (85% yield) was obtained with the juice having like qualities of those identified above.

EXAMPLE XII

Whole kiwi fruit were comminuted in a Fitz mill to a puree as was done with apples of Example I, and treated with about 0.04% by weight of ULTRA SL-P liquefaction enzyme composition at 35° C. for 90 minutes. The enzyme treated puree was then pumped to the ultrfiltration system (1¼" tube diameter—180 square feet of membrane—initial permeability to water of 5) at 300 pounds per square inch inlet pressure and a resulting 50 pounds per square inch outlet pressure. An equilibrium flux of 10 gallons per square foot per day was present. One hundred gallons per hour of kiwi juice were obtained, representative of an 85% yield, with the juice having like qualities as identified above.

It will be understood, of course, that while the form of the invention herein shown and described constitues a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. An improved process for obtaining friut juice from fruit containing same consisting essentially of the steps of:
   (a) processing friut from which said juice is to be obtained to produce a pumpable fluid puree of fruit and juice;
   (b) providing an elongated tubular rigid porous housing of predetermined size and length, said housing having a food grade ultrafiltration membrane secured along inside surfaces of same, said membrane having an initial permeability (P) to water of from about 1 to about 15 as determined by the formula $$P = \frac{\text{permeate flux}}{\text{pressure}}$$

where permeate flux is the number of gallons of water passing through a square foot of membrane per day and pressure is measured in pounds per square inch;
   (c) simultaneously extracting said juice from said puree and clarifying and sterilizing said juice by pumping said puree in a single pass through said tubular housing at an inlet pressure of from about 100 to about 1000 pounds per square inch during which said puree makes tangential contact with said membrane and said juice passes through said membrane and is extracted, clarified and sterilized thereby.

2. A method as defined in claim 1 wherein the fruit is comminuted to yield the pumpable fluid puree and is subjected to enzymatic action to reduce the viscosity of the puree.

3. A method as defined in claim 2 wherein at least one enzyme is added to the fruit during comminution of same.

4. A method as defined in claim 2 wherein at least one enzyme is added to the puree.

5. A method as defined in claim 2 wherein up to about 0.044 percent by weight of at least one enzyme is added to the fruit with an enzyme treatment time of from about 45 to about 90 minutes at a temperature in a range of from about 25° C. to about 50° C.

6. A method as defined in claim 1 wherein the initial permeability of the ultrafiltration membrane to water is about 5.

7. A method as defined in claim 1 wherein pressure in the tubular housing is controlled to achieve an exit pressure for the fruit concentrate of from about 50 to about 100 pounds per square inch.

8. A method of simultaneously extracting and ultrafiltrating fruit juice from a pumpable fluid puree of fruit and juice consisting essentially of continuously pumping the puree in a single pass through an elongated rigid, porous tubular housing having a diameter of from about ⅝ inch to about six inches and an effective length of from about 120 to about 600 feet, said tubular housing having a food grade metal oxide ultrafiltration membrane deposited on inside surfaces of same, said membrane having an initial permeability (P) to water of from about 1 to about 15 as determined by the formula $$P = \frac{\text{permeate flux}}{\text{pressure}}$$

where permeate flux is the number of gallons of water passing through a square foot of membrane per day and pressure is measured in pounds per square inch, pressure of said puree at the inlet to said housing being from about 100 to about 1000 pounds per square inch and pressure of concentrate from which juice has been extracted at the exit from said housing being in a range of from about 50 to about 100 pounds per square inch so that said juice is extracted from said puree and ultrafiltered by said membrane during said single pass through said housing and the puree concentrate remains fit for human consumption.

9. The method as defined in claim 8 wherein the puree has been subjected to enzymatic activity prior to being pumped through said housing.

10. The method as defined in claim 8 wherein prior to pumping the puree through said housing up to about 0.044 percent by weight of at least one enzyme is added to the puree with enzymatic activity being maintained at a temperature in a range of from about 25° C. to about 50° C. for a time period in a range of from about 45 to about 90 minutes.

11. The method as defined in claim 8 wherein the fruit from which juice is to be extracted is comminuted to yield a pumpable fluid puree, and during comminution up to about 0.044 percent by weight of at least one enzyme is added to the fruit.

12. The method as defined in claim 8 wherein the initial permeability of the ultrafiltration membrane is about 5, the diameter of the porous housing is about 1¼ inches, the housing is sintered stainless steel and the membrane is a metal oxide membrane formed in situ on inside surfaces of said housing.

13. The method as defined in claim 8 wherein said housing is located within a shell and juice passes through said porous housing onto an inside surface of said shell and is collected therefrom.

14. An improved process for obtaining juice from fruit consisting essentially of the steps of:
   (a) processing fruit to a fluid pumpable puree of fruit and juice;
   (b) pumping said puree of fruit and juice directly in a single pass through an ultrafiltration system at an inlet pressure in a range of from about 100 to about 1000 pounds per square inch, said system comprising a tubular rigid porous stainless steel housing having a diameter of from about ⅜ inch to about six inches, said housing having a food grade metal oxide ultrafiltration membrane deposited along the inside surfaces of same, said membrane having an initial permeability (P) to water of from about 1 to about 15 defined by the formula $$P = \frac{\text{permeate flux}}{\text{pressure}}$$

where permeate flux is gallons of water passing through a square foot of membrane in a day and pressure is measured in pounds per square inch, adequate area of said membrane being present to provide at least about 78 percent juice yield;

(c) controlling pressure drop along said housing to ensure continuous flow therethrough;

(d) collecting juice extracted from said puree outside said housing; and (e) collecting puree concentrate at an exit end of said housing.

15. The method as defined in claim 14 wherein the initial membrane permeability is from about 3 to about 6, effective length of the housing is from about 120 to about 600 feet and from about 20 to about 180 square feet of membrane is present.

16. The method as defined in claim 14 wherein the fruit is comminuted to provide the fruit-juice puree and up to about 0.044 weight percent of at least one enzyme is added to the fruit during comminution to reduce viscosity of the resulting puree.

17. The method as defined in claim 14 wherein the fruit is ground and thereafter finished to provide the fruit-juice puree and wherein prior to finishing, the fruit is subjected to up to about 0.044 weight percent of at least one enzyme at a temperature of from about 25° C. to about 50° C. for a period of from about 45 to about 90 minutes.

18. The method as defined in claim 14 wherein prior to pumping the fruit-juice puree to the ultrafiltration system, up to about 0.044 weight percent liquefaction enzyme is added to the fruit and permitted to act thereon at a temperature in a range of from about 25° C. to about 50° C. for from about 45 to about 90 minutes to effect a reduction in viscosity of the puree being pumped to the ultrafiltration system.

* * * * *